United States Patent
Porter

(10) Patent No.: US 6,929,237 B2
(45) Date of Patent: Aug. 16, 2005

(54) VALVE ACTUATION SYSTEM AND METHODS FOR PIPELINE VALVES

(75) Inventor: James R. Porter, Bolivar, OH (US)

(73) Assignee: Flo-Tork, Inc., Orrville, OH (US)

( * ) Notice: Subject to any disclaimer, the term of this patent is extended or adjusted under 35 U.S.C. 154(b) by 171 days.

(21) Appl. No.: 10/453,213

(22) Filed: Jun. 3, 2003

(65) Prior Publication Data

US 2004/0124383 A1 Jul. 1, 2004

Related U.S. Application Data

(60) Provisional application No. 60/385,700, filed on Jun. 4, 2002.

(51) Int. Cl.$^7$ ............................................. F16K 31/00
(52) U.S. Cl. ..................... 251/58; 251/304; 137/459; 137/460; 137/486; 137/7
(58) Field of Search ................. 251/58, 304, 305, 251/315.01; 137/455, 459, 460, 486

(56) References Cited

U.S. PATENT DOCUMENTS

| | | | |
|---|---|---|---|
| 2,738,945 A | | 3/1956 | Shafer |
| 2,791,093 A | | 5/1957 | Shafer |
| 3,650,506 A | * | 3/1972 | Bruton ......................... 251/26 |
| 4,102,128 A | | 7/1978 | Shafer et al. |
| 4,401,011 A | * | 8/1983 | Wallberg ..................... 91/400 |
| 4,436,105 A | * | 3/1984 | Goans ........................... 137/1 |
| 5,174,339 A | * | 12/1992 | Pickard ...................... 137/885 |
| 5,294,090 A | * | 3/1994 | Winnike ...................... 251/36 |
| 5,865,419 A | * | 2/1999 | Nelson et al. ................ 251/28 |
| 6,467,498 B1 | * | 10/2002 | Esmailzadeh ............... 137/238 |
| 2004/0031523 A1 | * | 2/2004 | Zeng .......................... 137/460 |

* cited by examiner

*Primary Examiner*—J. Casimer Jacyna
(74) *Attorney, Agent, or Firm*—Hahn Loeser + Parks LLP

(57) ABSTRACT

The invention is therefore directed to a rotary valve actuating system coupled to a pipeline for a pressurized fluid, the actuating system being coupled to the rotary valve to selectively cause operation of the valve. The valve actuating system comprises at least two reservoirs having an amount of an operating liquid in a first portion being coupled to an external source of pressurized fluid in a second portion thereof. A slideable piston is positioned within each of the reservoirs to isolate the first and second portions, and upon application of pressure from the external pressurized fluid against the slideable piston, operating liquid is supplied to actuate the rotary valve. In this manner, the operating liquid is isolated from the external source of pressurized fluid, such as supplied from the pipeline.

17 Claims, 3 Drawing Sheets

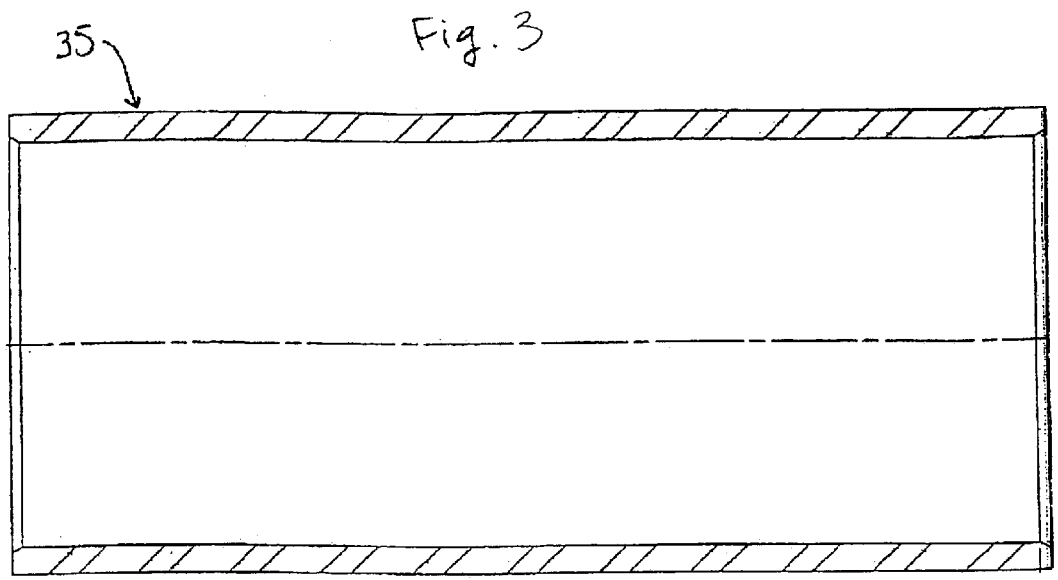
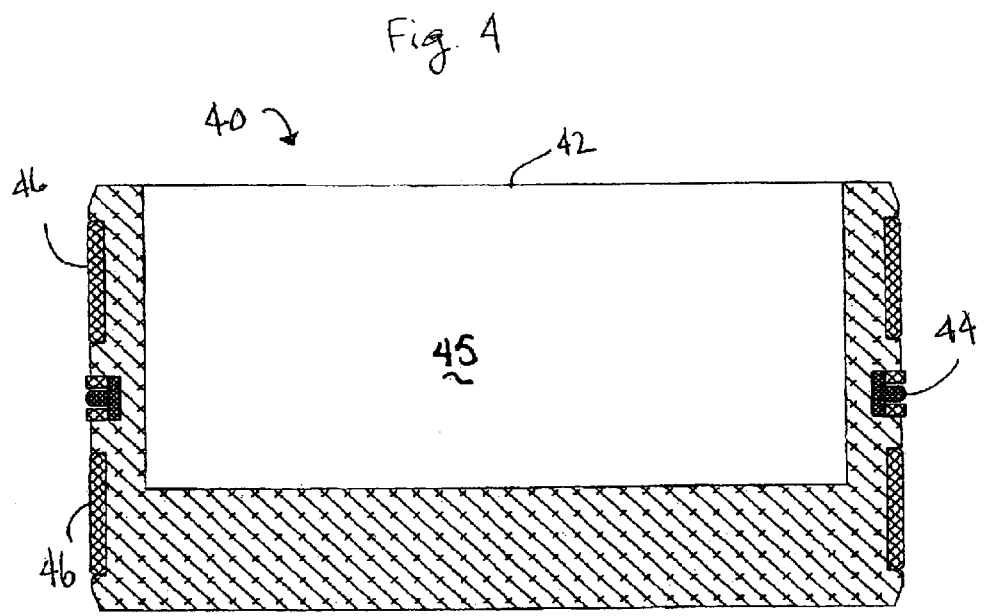

VALVE ACTUATION SYSTEM AND METHODS FOR PIPELINE VALVES

This application claims the benefit of Provisional application Ser. No. 60/385,700, filed Jun. 4, 2002.

TECHNICAL FIELD

This invention relates to a valve actuation system for a pipeline valve, which provides for pressure fluid operation using isolated fluid reservoirs for operation of the actuator.

BACKGROUND OF THE INVENTION

Pipelines used for transmission of fluids under pressure, such as natural gas, include pipeline valves, used for a variety of purposes. The pipeline valves may be designed to automatically close under certain conditions, such as when there is a substantial drop in pipeline pressure, due to a line break or the like. Actuating systems for pipeline valves have therefore been developed which operate from an auxiliary source of pressure fluid supplied from the pipeline in which the valve is installed. Such systems are referred to as "air over oil" actuators, wherein a hydraulic fluid is subjected to pressure from the pressurized fluid from the pipeline or other auxiliary pressure source to cause actuation of the valve. One such actuation system is described in U.S. Pat. No. 2,738,945, which shows use of such a system in conjunction with a vane type pipeline valve. Other types of pipeline valves include rack in pinion rotary valves or other suitable rotary valve configurations. In the prior actuation systems, although the "air over oil" system to operate the valve provides smooth and effective valve actuation, there are problems associated with such systems which cause significant problems for the pipeline operator. In known systems, hydraulic fluid reservoirs are oriented vertically and pressure from the pipeline is supplied to the reservoir from the top side thereof via a poppet block or control valve. In many cases, the control valve can fail, allowing pressurized fluid from the pipeline to blow through the control valve. The control valve exhausts to the atmosphere upon failure, and this action causes a siphoning effect within the reservoir, resulting in draining the hydraulic fluid from the system and to the exterior of the system or into external environment. As should be recognized, if hydraulic oil is exhausted to the external environment in this fashion, it causes a significant environmental concern. In such cases, pipeline operators are typically required to expend significant sums to clean up any exhausted hydraulic oil, which is exacerbated by the remote location of such valves.

It would therefore be beneficial to provide a pipeline valve actuating system which avoids these problems of the prior art, and provides for smooth and effective operation of the valve in an automatic fashion.

Another deficiency with respect to the prior art actuating systems is found in that once the control valve fails and hydraulic oil is exhausted from the system, it is then not possible to override the automatic actuating system by means of a manual safety override. With hydraulic oil exhausted from the system, the safety override provided in prior systems is rendered ineffective. Such safety overrides are required in the event that pipeline pressure has completely failed. It would therefore be advantageous to prevent exhaustion of hydraulic fluid from an actuating system, to ensure that manual safety overrides remain operational.

SUMMARY OF THE INVENTION

Based upon the foregoing, it is therefore an object of the invention to provide a pipeline valve actuating system which overcomes the deficiencies of the prior art, and provides for enhanced automatic operation of the pipeline valve.

It is further an object of the invention to provide a method of pipeline valve actuation which isolates the hydraulic fluid within the actuation system to prevent loss of hydraulic fluid from the system.

The invention is therefore directed to a rotary valve actuating system coupled to a pipeline for a pressurized fluid, the actuating system being coupled to the rotary valve to selectively cause operation of the valve. The valve actuating system comprises at least two reservoirs having an amount of an operating liquid in a first portion being coupled to an external source of pressurized fluid in a second portion thereof. A slideable piston is positioned within each of the reservoirs to isolate the first and second portions, and upon application of pressure from the external pressurized fluid against the slideable piston, operating liquid is supplied to actuate the rotary valve. In this manner, the operating liquid is isolated from the external source of pressurized fluid, such as supplied from the pipeline.

The invention is also directed to a method of actuating a rotary valve for a pipeline carrying a pressurized fluid, comprising the steps of providing an actuating system having at least two reservoirs with a slideable piston positioned in the reservoirs to separate the reservoirs into first and second portions. Within a first portion of each reservoir is provided a operating liquid which is selectively supplied to an operating mechanism for operating the rotary valve. A second portion of each reservoir is selectively pressurized with pressurized fluid from the pipeline coupled to each reservoir to selectively actuate the rotary valve.

These and other objects and advantages of the present invention will become apparent upon a reading of the following description in conjunction with the drawings.

BRIEF DESCRIPTION OF THE DRAWINGS

FIG. 3 is a cross sectional view of a cylinder tube associated with the actuating system according to the invention.

FIG. 4 is a side view of a piston assembly for use in the cylinder tube as shown in FIG. 3.

DETAILED DESCRIPTION OF THE INVENTION

Figure 1:
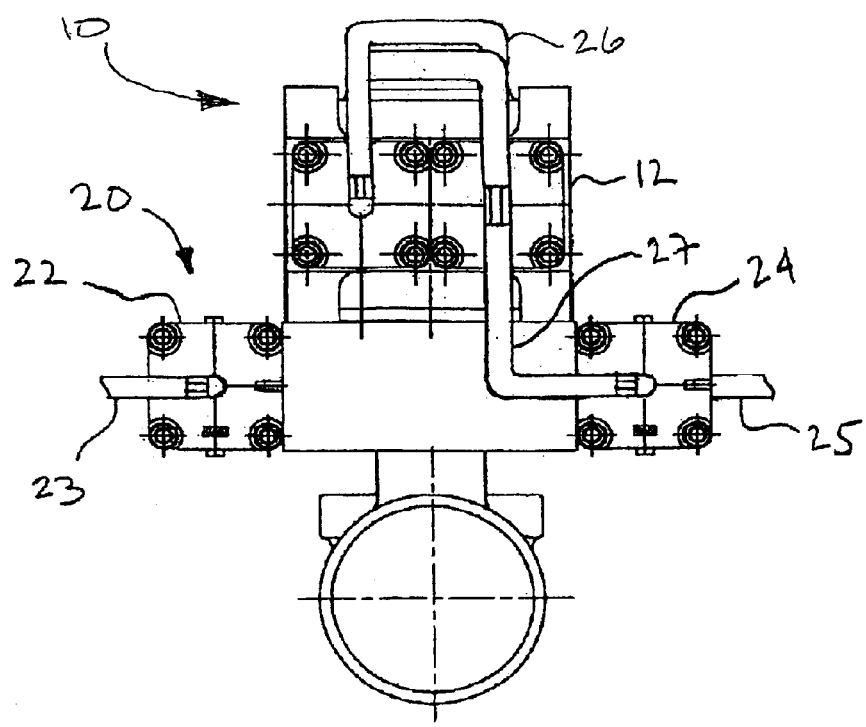
FIG. 1 is a rear view of a rotary valve actuating system according to an embodiment of the invention.
Figure 2:
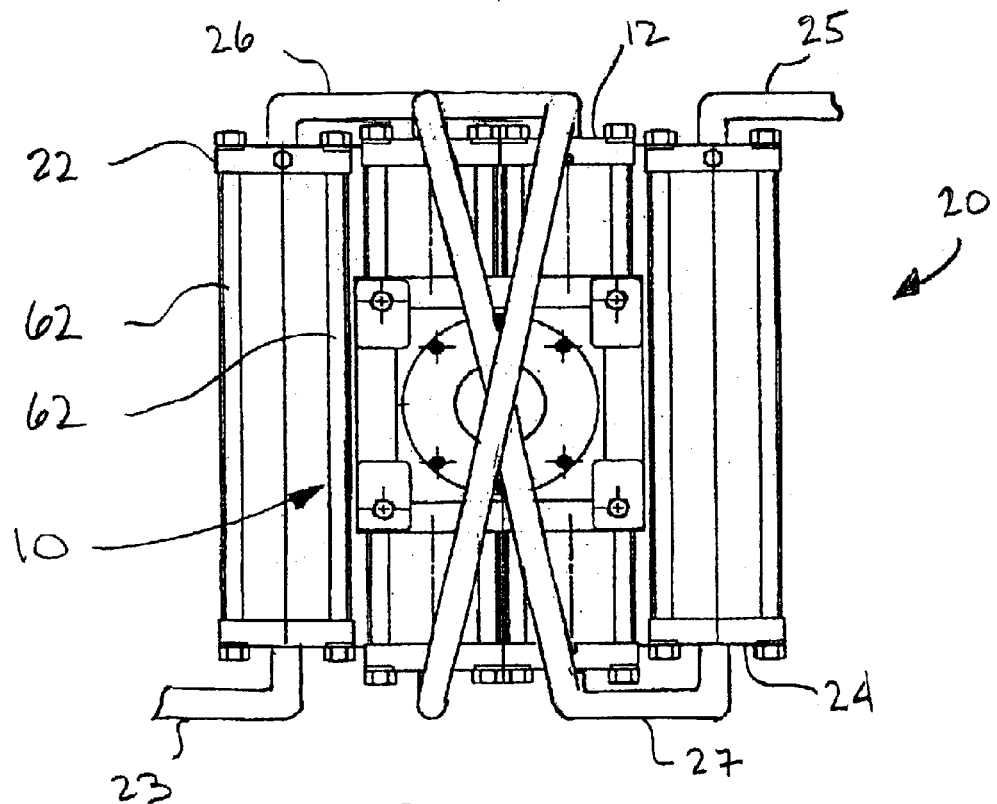
FIG. 2 is a top view of the embodiment as shown in FIG. 1.
Figure 5:
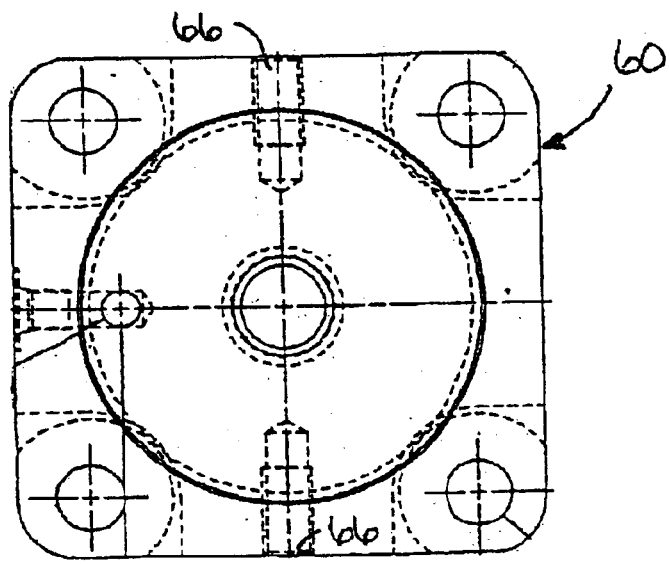
FIG. 5 is a front view of an end cap for use with the cylinder tube as shown in FIG. 3.

Turning now to FIGS. 1–2, a pipeline section 100 forms a part of a pressurized pipeline, such as for carrying natural gas or other pressurized fluid. Such pipelines may typically operate at pressures of 400–1200 psi. In such environments, various problems may occur which require closing of the pipeline at intervals by means of a rotary valve, generally designated 10. The rotary valve is of known construction, and may be of the ball or butterfly type as an example, such as produced by Rockwell Corp., Cooper Co. or others. An actuating system for the rotary valve may also be of known construction, such as of the rack and pinion or vane type, as produced by Flo-Tork, Inc. or Shafer Corp. The actuation system for the rotary valve 10 is generally designated 20, which operates automatically in response to the application of pressure supplied by the pipeline 100 or other external auxiliary source of pressure the present invention is directed at an improved air over oil system for the actuation system 20. In general, the rotary valve 10 has a valve body with a rotatable element therein (not shown) to which a valve stem is secured which extends upwardly from the valve body. The valve stem 11 is rotatably received within a actuator housing 12. A rack and pinion assembly (not shown) within the actuator housing 12 is operated by fluid pressure applied to opposing sides of the rack associated with the rack and pinion system so as to selectively translate the rack and cause rotation of the pinion, in turn causing rotation of the rotary valve stem and opening or closing of the valve within the pipeline 100.

The invention is directed at the actuating system for the rotary valve, and more specifically for operating the actuator, whether being of the rack and pinion design as described, a vane type actuator or other suitable configuration. The actuating system 20 provides automatic control for operation of the rotary valve 10 in a selective fashion. A conduit (not shown) is connected to the pipeline 100, and on the high pressure side of the actuator housing 12, or other suitable conduit system to supply pressurized fluid to the system. A reversing valve (not shown) is connected to the pipeline pressure conduit to selectively direct pipeline pressure fluid into the reservoirs 22 and 24 through conduits 23 and 25 respectively. The reservoirs 22 and 24 have a hydraulic fluid or other suitable liquid therein in one portion, as will be hereinafter described. At the opposing end of the reservoir 22 and 24, conduits 26 and 27 supply hydraulic fluid to the valve motor for actuation thereof.

Turning now to FIGS. 3-6, the construction of the reservoirs 22 and 24 will be described in more detail. In prior art systems, the reservoirs containing hydraulic fluid for actuation of the rotary valve 10 were oriented in a vertical direction, and contained an amount of hydraulic fluid at a bottom portion thereof. Pressurized fluid from the pipeline is directed to the upper portion of the reservoir above the hydraulic fluid so as to force fluid from the reservoir for actuation of rotary valve 10. In the present invention, the reservoirs 22 and 24 provide isolation between the hydraulic fluid in a first portion of the reservoir 22 or 24, and the pressurized fluid in a second portion as supplied from the pipeline 100. A piston assembly 30 isolates the two portions within the reservoirs 22 and 24, to prevent and possible egress of the hydraulic fluid from the reservoirs 22 and 24.

Figure 6:
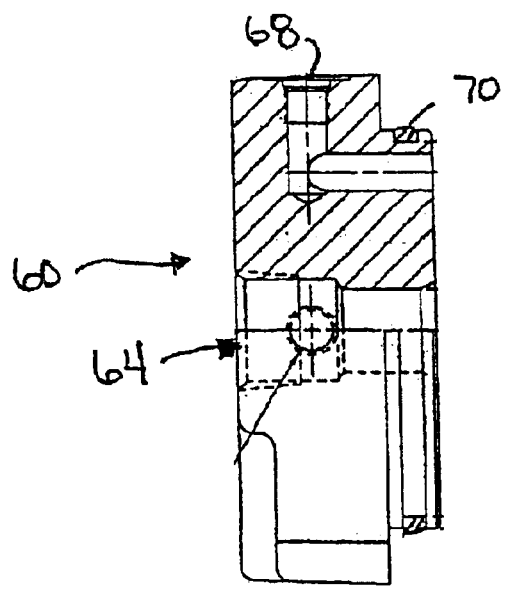
FIG. 6 is a partial cross sectional view of the end cap as shown in FIG. 5.

The reservoirs 22 and 24 may each comprise a cylinder tube 35 as shown in FIG. 3, having a selected length and internal volume for a particular type and size of rotary valve 10 and pipeline 100. A piston assembly 40 is positioned within the internal cavity of the cylinder tube 35, so as to be slideable therein. The piston assembly 40 may comprise a piston body 42 having a t-seal 44 seal first and second portions within the cylinder tube 35. Other suitable seals may also be used. Wear rings 46, such as of a Teflon or other suitable material, are provided to assist slideable movement of the piston assembly 40 within the cylinder tube 35, and to prevent wear of the internal diameter of the cylinder tube 35. A hollow cavity 45 may be provided in the piston body 42 to allow ease of use of external manual pressure sources. As seen in FIG. 6, end caps 60 seal opposing ends of the cylinder tube 35, with the piston assembly positioned therein. The cylinder caps 60 may be assembled to seal the cylinder tube in any desired configuration, such as by tie rods 62 (shown in FIG. 1). A central pressure port 64 is provided in each end cap 60, for the movement of pressurized fluid from either first or second portions of the cylinder tube respectively. The end cap 60 may also include tapped holes 66 for mounting of the entire cylinder tube assembly in any desired configuration with respect to the rotary valve 10. As each of the cylinder tube assemblies is completely sealed, and the piston assembly isolates the first and second portions of the cylinder tube, the assembly can be mounted in any configuration while being fully operative, such as vertically, horizontally or of an angle. The end caps 60 may further include bleed ports 68 to facilitate initial set up of the system for operation. The bleed ports 68 are positioned in opposite manners depending upon whether they are associated with the pneumatic side of the cylinder tube or the hydraulic side. On the pneumatic side, the bleed port 68 is positioned to allow egress from a lower portion of the cylinder tube, to allow draining of any condensation which may accumulate therein. On the hydraulic side of the cylinder tube, the bleed port is positioned to allow bleeding of air out of the top of the system, to facilitate filling of the hydraulic fluid into this portion of the cylinder tube during initial set up. The end caps 60 further comprise O-ring seals 70 for sealing of the caps with the cylinder tube 35.

It should be recognized that use of the actuator system according to the invention provides isolation of the hydraulic fluid side of the actuating system, to prevent the possible exhaustion of hydraulic fluid from the system as in prior art arrangements. The invention also provides a method for actuating the rotary valve associated with a pipeline which isolates the hydraulic fluid from the pressurized fluid supplied from the pipelines.

Further, it would be possible to mount the reservoirs 22 and 24, comprising the cylinder tube assemblies, in a remote location in relation to the rotary valve 10. This may be desirable in a variety of situations, such as where excessive vibration or other external factors may effect operation of the system. Alternatively, the actuating system according to the invention could provide remote mounted reservoirs 22 and 24 for actuating a plurality of rotary valves situated in relative proximate location to one another. For example, at compressor stations associated with natural gas pipelines, a number of rotary valves are used with bypass, suction and discharge sections of the pipeline at the compressors station. The present invention allows for operation of multiple rotary valves in such an environment by means of a single actuating system. The actuating system may therefore be sized and configured for the size and number of valves to be operated, with the size of the cylinder tube assemblies being adjusted accordingly.

Additionally, a hydraulic fluid pump or other suitable auxiliary pressure source can be used in a safety backup system, without the chance of the system becoming inoperative due to lack of hydraulic fluid.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A rotary valve actuating system selectively coupled to a pipeline for a pressurized fluid, with the actuating system coupled to at least one rotary valve to cause operation thereof, comprising at least two reservoirs having an amount of an operating liquid in a first portion thereof, each of the reservoirs being selectively coupled to an external source of pressurized fluid in a second portion thereof, and a slideable piston positioned within each of the reservoirs to isolate the first and second portions, wherein each of said reservoirs further supplies operating liquid to selectively actuate the rotary valve upon application pressure applied by the external pressurized fluid against the slideable piston in at least one of the reservoirs.

2. A rotary actuating system as described in claim 1, wherein said operating fluid is hydraulic fluid.

3. A rotary valve actuating system as described in claim 1, wherein said external source of pressurized fluid is said pipeline.

4. A rotary valve actuating system as described in claim 1, wherein at least two reservoirs are mounted in a horizontal orientation.

5. A rotary valve actuating system as described in claim 1, wherein the operating fluid is sealed within the first portion.

6. A rotary valve actuating system as described in claim 1, wherein the reservoirs comprise a cylinder tube in which the piston is slideably disposed, with the cylinder tube being sealed by end caps.

7. A rotary valve actuating system as described in claim 6, wherein the piston has a seal which seals with the internal wall of the cylinder tube to isolate the first and second portions.

8. A rotary valve actuating system as described in claim 6, wherein the piston includes wear surfaces which engage the internal wall of the cylinder tube.

9. A rotary valve actuating system as described in claim 6, wherein the piston includes a hollow cavity.

10. A rotary valve actuating system as described in claim 6, wherein the end caps include a pressure port.

11. A rotary valve actuating system as described in claim 10, wherein the end cape further comprise a bleed port.

12. A rotary valve actuating system as described in claim 1, wherein a plurality of valves are operated by the actuating system.

13. A rotary valve actuating system as described in claim 10, where the at least two reservoirs are positioned remote to the at least one valve.

14. A kit for controlling the actuation of at least one rotary valve comprising at least two reservoirs having a first portion containing an operating liquid, a slideable piston assembly within each of the reservoirs isolating the operating liquid therein, and a second portion within each reservoir to which pressurized fluid from an external source is selectively introduced, whereby movement of the piston assembly within the reservoir moves the operating liquid for actuation of the rotary valve.

15. A method for actuating at least one rotary valve for a pressurized fluid pipeline, comprising the steps of providing an actuating system having at least two reservoirs with an amount of operating liquid in a first portion thereof, a slideable piston assembly within each of the reservoirs isolating the operating liquid therein, and providing a second portion within each reservoir to which pressurized fluid from an external source is selectively introduced, whereby movement of the piston assembly within the reservoir moves the operating liquid for actuation of the rotary valve.

16. A method as described in claim 15, wherein said operating liquid is hydraulic fluid.

17. A method as described in claim 15, wherein said external source of pressurized fluid is said pipeline.

\* \* \* \* \*